United States Patent
Gupta et al.

(10) Patent No.: US 12,021,720 B2
(45) Date of Patent: Jun. 25, 2024

(54) METHODS AND APPARATUS TO GENERATE DYNAMIC LATENCY MESSAGES IN A COMPUTING SYSTEM

(71) Applicant: Intel Corporation, Santa Clara, CA (US)

(72) Inventors: Ajay Gupta, Portland, OR (US); Ravikumar Balakrishnan, Beaverton, OR (US); Shahrnaz Azizi, Cupertino, CA (US); Maruti Gupta Hyde, Portland, OR (US); Ariela Zeira, Encinitas, CA (US); Arjun Anand, Santa Clara, CA (US); Jacob Winick, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 736 days.

(21) Appl. No.: 16/937,267

(22) Filed: Jul. 23, 2020

(65) Prior Publication Data

US 2020/0358685 A1    Nov. 12, 2020

(51) Int. Cl.
*H04L 43/0852* (2022.01)
*G06F 1/3203* (2019.01)
(Continued)

(52) U.S. Cl.
CPC ........ *H04L 43/0852* (2013.01); *G06F 1/3203* (2013.01); *H04L 47/10* (2013.01); *H04L 47/50* (2013.01)

(58) Field of Classification Search
CPC ............. H04L 41/0631; H04L 41/0686; H04L 43/0817; H04L 12/863; H04L 47/10;
(Continued)

(56) References Cited

U.S. PATENT DOCUMENTS

2011/0040706 A1    2/2011  Sen et al.
2016/0105847 A1*   4/2016  Smith ................... H04L 67/125
                                                           370/252
(Continued)

FOREIGN PATENT DOCUMENTS

WO    2005002137       1/2005
WO    2016050916 A1    4/2016

OTHER PUBLICATIONS

European Patent Office, "Extended European Patent Office," issued in connection with European patent application No. 20216299.6 dated Jun. 8, 2021, 14 pages.
Aruba a Hewlett Packard Enterprise Company, "White Paper 802.11AX," retrieved from https://www.arubanetworks.com/assets/wp/WP_802.11AX.pdf, 38 pages.

(Continued)

*Primary Examiner* — Iqbal Zaidi
(74) *Attorney, Agent, or Firm* — Hanley, Flight & Zimmerman, LLC

(57) ABSTRACT

Methods, apparatus, systems, and articles of manufacture are disclosed that generate dynamic latency values. An example apparatus includes an active status controller to determine that a modem is active based on a number of packets obtained from a network, a prediction controller to predict that the number of packets are indicative of a workload type based on a trained model, and a latency value generator to generate a latency value based on the workload type of the number of packets, the latency value to cause a processor processing the number of packets to enter a power saving state or a power executing state.

16 Claims, 8 Drawing Sheets

(51) Int. Cl.
*H04L 47/10* (2022.01)
*H04L 47/50* (2022.01)

(58) Field of Classification Search
CPC ..... H04L 47/50; H04L 5/0007; H04B 7/0626; H04W 72/0453; H04W 28/02; H04W 28/0221; H04W 28/06; H04W 76/046
See application file for complete search history.

(56) References Cited

U.S. PATENT DOCUMENTS

| | | | |
|---|---|---|---|
| 2016/0359661 A1 | 12/2016 | Chhabra et al. | |
| 2019/0199602 A1 | 6/2019 | Zhang et al. | |
| 2020/0084102 A1 | 3/2020 | Choi et al. | |
| 2020/0341791 A1* | 10/2020 | Tsirkin | G06F 1/28 |
| 2020/0359265 A1 | 11/2020 | Azizi et al. | |
| 2020/0382922 A1* | 12/2020 | Park | H04W 4/46 |

OTHER PUBLICATIONS

Thomas-Krenn-Wiki, "Processor P-states and C-states," retrieved from https://www.thomas-krenn.com/en/wiki/Processor_P-states_and_C-states, Jan. 7, 2019, 4 pages.

Jeyaseelan et al., "Devices Guidelines for PCI Express* Technology Extensions," Intel Development Forum 2010, 31 pages.

Draper-Gil et al., "Characterization of Encrypted and VPN Traffic using Time-related Features," Proceedings of the 2nd International Conference on Information Systems Security and Privacy (ICISSP). 2016, pages pp. 407-414 (8 pages).

United States Patent and Trademark Office, "Non-Final Office Action", issued in connection with U.S. Appl. No. 16/937,270 dated Oct. 4, 2023, 21 pages.

United States Patent and Trademark Office, "Notice of Allowance and Fee(s) Due," issued in connection with U.S. Appl. No. 16/937,270, dated Mar. 12, 2024, 12 pages.

* cited by examiner

US 12,021,720 B2

METHODS AND APPARATUS TO GENERATE DYNAMIC LATENCY MESSAGES IN A COMPUTING SYSTEM

FIELD OF THE DISCLOSURE

This disclosure relates generally to computing systems, and, more particularly, to methods and apparatus to generate dynamic latency messages in a computing system.

BACKGROUND

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) results in output(s) consistent with the recognized patterns and/or associations.

BRIEF DESCRIPTION OF THE DRAWINGS

The figures are not to scale. In general, the same reference numbers will be used throughout the drawing(s) and accompanying written description to refer to the same or like parts.

Figure 1:
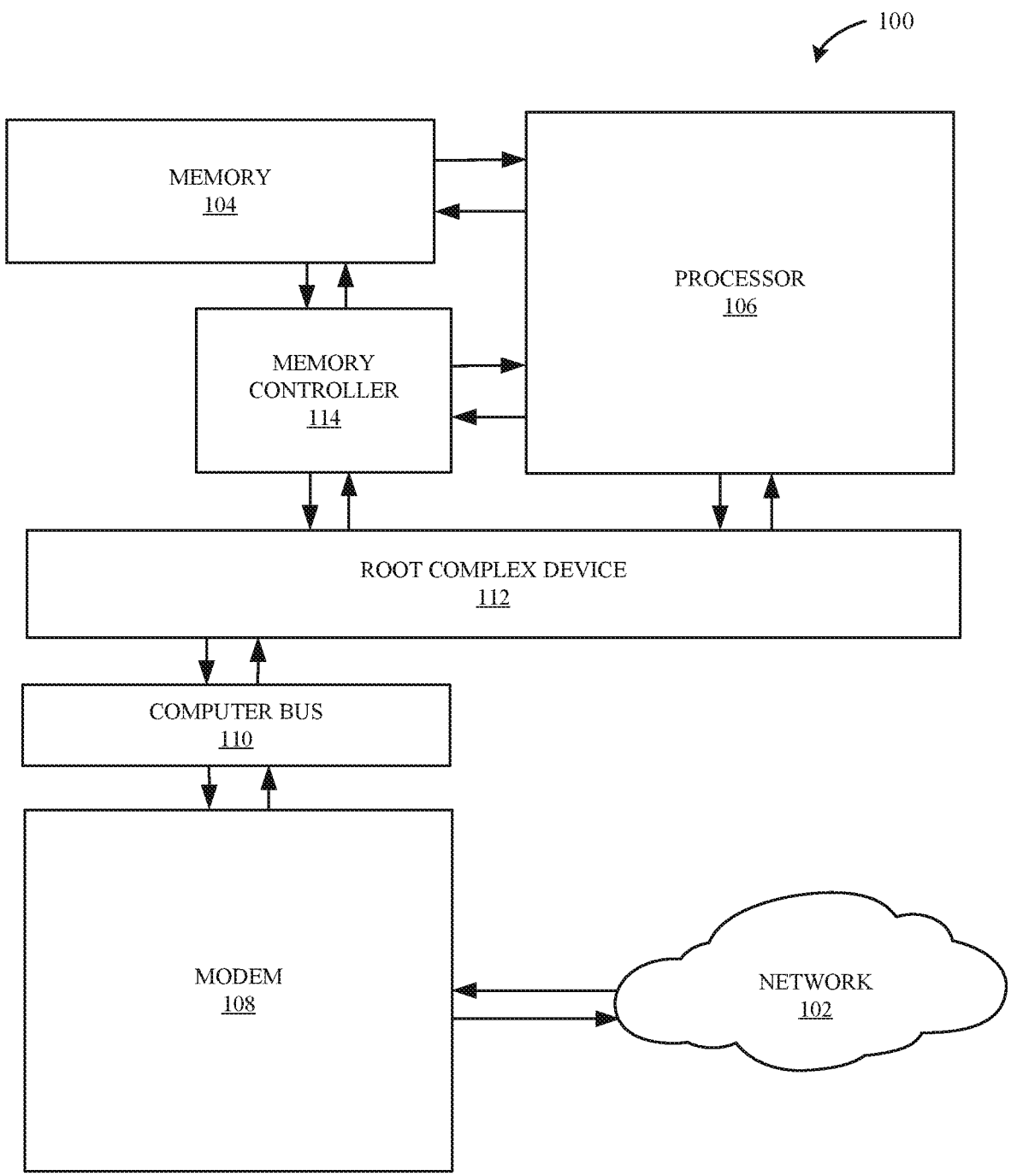
FIG. 1 is a block diagram of an example computing device platform to generate dynamic latency values based on network traffic.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A modem is a hardware device that converts data into a format suitable for a transmission medium so that it can be transmitted from one computing system to another. In recent years, modems have been integrated on platforms of personal computing devices, such as laptops, tablets, mobile phones, etc., to facilitate data transmission and data connection between the personal computing devices and a network. For example, modems convert data from a network into a form that processors of the personal computing device can understand and then send the data to memory accessed by the processors. Developers of the integrated platforms have designed and fabricated hardware and software features that enable such an integrated platform to efficiently move data to and from a network and the main processing component (e.g., central processing unit, accelerator, etc.). Such features may facilitate a communication and/or coordination system between the main processing component and the modem, where the modem can coordinate particular times to send data to memory accessed by the main processing unit.

In some examples, the coordination between the main processing component and modem facilitates power saving by enabling the main processing component to enter low power states when the modem determines that access to memory is not needed. For example, interrupt coalescing is a coordination feature that reduces the number of interrupts (e.g., the number of signals sent to the CPU from the modem) to the main processing component (e.g., CPU) in particular situations (e.g., high throughput situations). For example, when the modem is in an active state, the interrupt coalescing feature holds back interrupts to the CPU until a timeout timer triggers, incurring relatively small or large latency penalties. In such an example, the modem buffers data from the network to reduce the number of interrupts to the main processing component. However, interrupt coalescing is not an efficient power saving method given that different types of workloads (e.g., data packets from the network) require different levels of interrupts (e.g., different latency requirements) and that different personal computing devices can execute (e.g., run) multiple different workloads (e.g., applications, programs, etc.) at once. For example, workloads corresponding to voice calls may require a higher level of interrupting to enable the main processing unit to immediately access and execute data packets, thus minimizing buffering in the modem and reducing latency between the modem and processing unit. In other examples, workloads corresponding to file downloading may allow for buffering in the modem and increased latency so that the number of interrupts to the host can be minimized. Additionally, if the personal computing device is processing a voice call while performing file downloading, the modem cannot buffer the data packets from the network nor minimize interrupt signaling to the main processing component, even though some of the data packets correspond to the file download.

Examples disclosed herein generate dynamic latency values and, thus, dynamic interrupts based on how long network data packets can be buffered, which is dependent on workload types running on a processor (e.g., CPU, graphics processing unit (GPU), field programmable gate array (FPGA), etc.). As used herein, the latency values are values of time that indicate an amount of time the modem can buffer network data packets before the modem no longer has available memory. Therefore, the latency values indicate whether the processor is to enter a power saving state or a power execution state. For example, the latency value informs the processor and/or memory that the modem will be buffering network data packets for a period of time (e.g., a maximum amount of time) before the modem will attempt to access memory. Such latency values and interrupts can be dynamic in terms of throughput and tolerance, where the throughput corresponds to throughput of network data packets and the tolerance corresponds to how much latency can be tolerated for the workload of the data without impacting user experience. Examples disclosed herein train a model to classify network data packets into a workload category (e.g., a workload type). Examples disclosed herein include a modem that, when active, infers the type of incoming network data packets and makes a decision about the latency required to process the type of network data packets.

Additionally, in examples disclosed herein, the modem tags network data packets with a priority label that indicates whether the network data packet is a high priority workload (e.g., a voice call) or a lower priority workload (e.g., a file download). For example, during training of the model, the modem is provided with workload categories that are classified as high priority, low priority, and intermediate priority. Therefore, during an inference phase, the modem determines the workload category of incoming network data packets as well as a priority class, which facilitates the generation of dynamic latency values.

Examples disclosed herein implement artificial intelligence to generate dynamic latency values that enable a processor to enter a power saving state or a low power state. Artificial intelligence (AI), including machine learning (ML), deep learning (DL), and/or other artificial machine-driven logic, enables machines (e.g., systems, computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a neural network model is used. Using a neural network model enables the classification of network data packets based on their packet features, such as length (e.g., number of packets corresponding to a same workload flow), inter-arrival time, source, destination, etc. In general, machine learning models/architectures that are suitable to use in the example approaches disclosed herein will be Recurrent Neural Networks (RNN). However, other types of machine learning models could additionally or alternatively be used such as Long/Short Term Memory (LSTM) models, a Radial basis models, Kohonen Self Organizing models, etc.

In general, implementing a ML/AI system involves at least two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using stochastic gradient descent. However, any other training algorithm may additionally or alternatively be used. In examples disclosed herein, training is performed until an acceptable amount of error is achieved in predicting and classifying network data packets. In examples disclosed herein, training is performed at the computing device (e.g., locally). In some examples, training is performed remotely (e.g., at a central facility). Training is performed using hyperparameters that control how the learning is performed (e.g., a learning rate, a number of layers to be used in the machine learning model, etc.). In examples disclosed herein, hyperparameters that control a number of packet features and packets per network flow are used. Such hyperparameters are selected based on, for example, compute capabilities of the computing device and/or the central facility and real-time requirements. In some examples re-training may be performed. Such re-training may be performed in response to an unknown packet features, new workload categories, etc.

Training is performed using training data. In examples disclosed herein, the training data originates from locally generated data. Because supervised training is used, the training data is labeled. Labeling is applied to the training data by a pre-process controller. In some examples, the training data is pre-processed using, for example, known features that indicate a workload type of network data packets.

Once training is complete, the model is deployed for use as an executable construct that processes an input and provides an output based on the network of nodes and connections defined in the model. The model is stored at the modem of the personal computing device. The model may then be executed by the prediction controller of the modem. In other examples, a network interface card (NIC) stores the model at the personal computing device, where the host networking stack is executed. Additionally and/or alternatively, the model is stored externally if the modem does not have the resources (e.g., compute capabilities) to execute such a model.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns of the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.). For example, a workload may be classified as real-time or non-real-time, where the real-time workload is further classified as a type of real-time (e.g. audio only, audio video, gaming, etc.) workload and the non-real time workload may be further classified as a type of non-real-time workload.

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

FIG. 1 is a block diagram of an example computing device platform 100 to generate dynamic latency values and dynamic interrupt triggers based on network traffic. As used herein, network traffic, network data, network packet data, incoming network data, and packet data are terms that are defined as data, received from an example network 102, that is to be stored in an example memory 104 and executed by an example processor 106 to perform an example operation. As used herein, interrupt triggers, interrupts, and an interrupt trigger are terms that are defined as events generated to access memory 104 of the computing device platform 100 for providing network data. The example computing device platform 100 includes the example memory 104, the example processor 106, an example modem 108, an example local computer bus 110, an example root complex device 112, and an example memory controller 114.

In FIG. 1, the example computing device platform 100 is hardware and/or software implemented to execute workloads, such as applications, programs, process, etc., at a computing device. The example computing device platform 100 defines a set of capabilities of the computing device. The computing device platform 100 may be any hardware computing device such as a mobile phone, laptop, tablet, desktop, etc., any operating system platform, any client/server platform such as a web server, any mobile platform such as a mobile application platform, any cloud platform, and/or any other suitable platform for executing data packets.

In FIG. 1, the example computing device platform 100 is connected to the example network 102 via any suitable wired or wireless connection. In FIG. 1, the network 102 is the Internet. However, the network 102 may be implemented using any suitable wired and/or wireless network(s) including, for example, one or more data buses, one or more Local Area Networks (LANs), one or more wireless LANs (WLANs), one or more cellular networks, one or more private networks, one or more public networks, etc. The example network 102 enables the computing device platform 100 to send and receive information requested by a user of the computing device platform 100.

In FIG. 1, the example computing device platform 100 includes the example memory 104 to store network data for subsequent execution by the example processor 106. The example memory 104 may be any suitable memory, such as volatile random access memory (RAM), cache memory, etc. The example memory 104 is connected to the example processor 106 and the example memory controller 114 to store and allocate data.

In FIG. 1, the example computing device platform 100 includes the example processor 106 to perform workload execution of network data. The example processor 106 may be a CPU, an FPGA, a GPU, an accelerator, and/or any other type of hardware that executes workloads. The example processor 106 includes multiple power modes, which are collectively called "C-states" or "C-modes." The C-states enable the example processor 106 to enter into particular power saving modes. For example, a first C-state (C0) is indicative that the processor 106 is operating using full power. A second C-state (C1) is indicative that only a portion of the example processor 106 is operating with full power but a different portion is turned off (e.g., not provided power). A third C-state (C2) is indicative that more than half of hardware in the example processor 106 is turned off but a smaller portion of the processor hardware is still operating. A fourth C-state (C3) is indicative that the example processor 106 is in a sleep state (e.g., the hardware is turned off and power supplied to the processor 106 is reduced). In some examples, the processor 106 enters different C-states corresponding to different power saving levels not described above. When the example processor 106 enters a C-state greater than the first C-state, power consumption of the example computing device platform 100 is reduced, thus saving battery life. The example processor 106 is informed of the level of C-state to enter based on the type of workloads the processor 106 is to execute. For example, the C-state is determined based on latency values, where the greater the latency value, the greater the C-state and thus less power consumed.

In FIG. 1, the example computing device platform 100 includes the example modem 108 to mediate data communication between the example network 102 and the example processor 106. The example modem 108 may transform network data into information readable and executable by the example processor 106. The example modem 108 may determine types of network data being received and generate messages to facilitate a coordination of the network data based on the types determined. The example modem 108 may buffer network data to allow the example processor 106 to enter into different C-states. The example modem 108 may generate interrupts to wake the memory 104 and processor 106 for retrieving the network data. In some examples, the modem 108 is a network interface card (NIC). Additionally and/or alternatively, the modem 108 may be any suitable hardware and/or software interface that mediates data communication (e.g., coordinates buffering and interrupting) between the example network 102 and the example processor 106. The example modem 108 can be in different states depending on different states of the example computing device platform 100 (e.g., on or off). When the example computing device platform 100 is on, the example modem 108 can be in a sleep state, an idle state, or an active state. The states of the modem 108 also depend on the network traffic from the example network 102. For example, the modem 108 is active when the modem 108 receives data from the network 102, when the modem 108 sends data to the memory 104, when the modem 108 sends data to a different computing device via the network 102, etc. The example modem 108 is idle when the modem 108 buffers data from the example network 102. The example modem 108 is in a sleep state when the example modem 108 is not receiving data from the example network 102 and/or from the example memory 104, when the example computing device platform 100 is off, etc. In some examples, the state of the modem 108 is associated with the C-states of the processor 106.

In some examples, the modem 108 is implemented at an edge device. For example, the modem 108 is not implemented by the computing device platform 100 but is in communication with the computing device platform 100 and operating (e.g., implemented) at the edge device. In other examples, the modem 108 is implemented at a cloud platform. For example, the modem 108 is not implemented by the computing device platform 100 but is instead in communication with the computing device platform 100 and implemented by a cloud platform. In such examples, the modem 108 reduces the processing power consumption consumed at the computing device platform 100 and the processing tasks operating (e.g., executing) at the computing device platform 100. The example modem 108 is described in further detail below in connection with FIGS. 2 and 3.

In FIG. 1, the example computing device platform 100 includes the example computer bus 110 to connect the example modem 108 to the example memory controller 114, and the example processor 106. The example computer bus 110 facilitates communication between the modem 108 and the other devices of the example computing device platform 100. For example, the computer bus 110 obtains notifications, messages, information, data, etc., from the modem 108 and directs the data to the appropriate hardware components of the computing device platform 100. In some examples, the computer bus 110 is included in the modem 108. Additionally and/or alternatively, the example computing device platform 100 includes any number of computer busses 110 to connect different hardware components of the computing device platform 100. The example computer bus 110 is a peripheral component interconnect express (PCI-e) device. Additionally and/or alternatively, the example computer bus 110 is an accelerated graphics port (AGP), a peripheral component interconnect extended (PCI-X) device, and/or any other suitable bus for the example processor 106.

In FIG. 1, the example computing device platform 100 includes the example root complex device 112 to connect the example memory 104 and the example processor 106 to the example computer bus 110. The example root complex device 112 generates transaction requests on behalf of the example processor 106, which is interconnected through a local bus. The example root complex device 112 may be a root complex functionality implemented as a discrete device or integrated with the example processor 106. In some examples, the root complex device 112 may be a host bridge that interfaces the host (e.g., the processor 106) with the computer bus 110.

In FIG. 1, the example computing device platform 100 includes the example memory controller 114 to store and retrieve data from the example memory 104 based on instructions from the example processor 106 and/or the example modem 108. For example, the memory controller 114 includes logic that reads an input (e.g., instructions) and manages data storage and eviction based on the input. In some examples, the modem 108 instructs the memory controller 114 to give network data to the processor 106, halt communications with the processor 106, etc.

Figure 2:
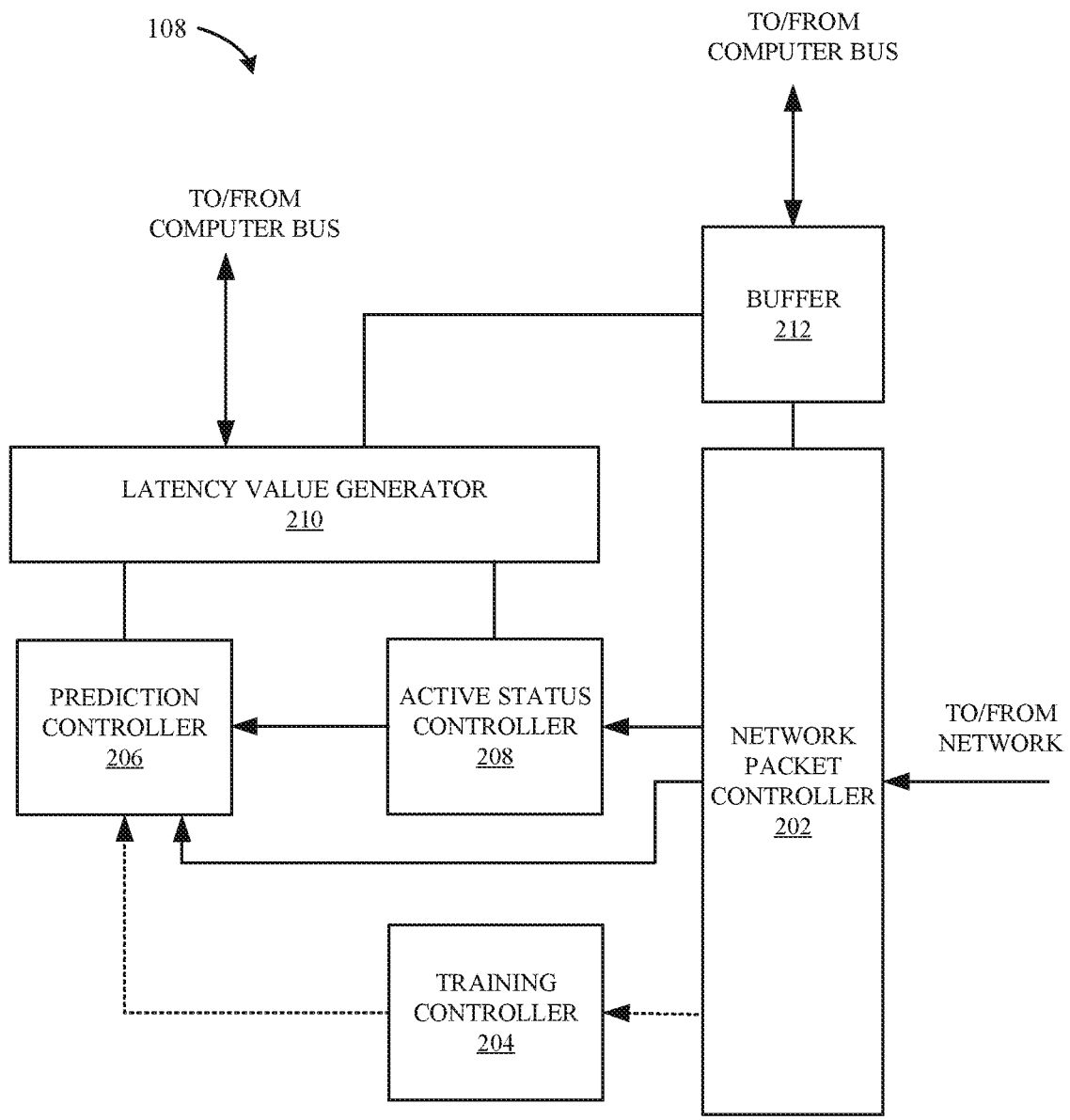
FIG. 2 is a block diagram of an example modem of the example computing device platform of FIG. 1 to generate the dynamic latency values based on network traffic.

Turning to FIG. 2, a block diagram of the example modem 108 to generate latency values based on data from the example network 102 is illustrated. The example modem 108 includes an example network packet controller 202, an example training controller 204, an example prediction controller 206, an example active status controller 208, an example latency value generator 210, and an example buffer 212. The dotted flow lines represent the training phase to train a model to predict workload types based on the network data packets. For example, the operations performed by the network packet controller 202 and the training controller 204 occur in a learning and/or training phase of the computing device platform 100. The solid flow lines represent the inference phase to predict the workload types based on the trained model. For example, the operations performed by the network packet controller 202, the active status controller 208, the prediction controller 206, and the latency value generator 210 occur in an inferring and/or predicting phase.

In FIG. 2, the example modem 108 includes the example network packet controller 202 to control network data packet flows coming in from the example network 102. A network data packet is a formatted unit of data carried by the network 102 that consists of a payload (e.g., control information and user data) and five tuples: a source address, a source port, a destination address, a destination port, and a protocol. The example network packet controller 202 may identify and/or separate network data packets belonging to different tuples. For example, the network packet controller 202 collects network data packets that may correspond to different workloads (e.g., the computing device platform may be running an email application and a conference call simultaneously). The example network packet controller 202 can identify the different network data packets based on the five tuples, wherein if a first network data packet and a second network data packet have matching tuples, then the network data packets correspond to the same workload. The example network packet controller 202 operates in a training mode or an inference mode. For example, in training mode, the network packet controller 202 passes the network data packets to the training controller 204. In other examples, in inference mode, the network packet controller 202 passes the network data packets to the prediction controller 206 (e.g., via the active status controller 208 or other means of wireless and/or wired communication). The example network packet controller 202 of FIG. 2 may implement means for controlling. The controlling means is hardware including at least one processor.

In FIG. 2, the example modem 108 includes the example training controller 204 to train a model to classify network data packets into a workload type category. The example training controller 204 obtains network data packets from the example network packet controller 202 and pre-processes the network data packets into samples with assigned labels, the samples related to a single network flow (e.g., a workload) and including multiple packet features. The example training controller 204 inputs the samples into an example neural network to enable the model to learn, through the features of the samples and assigned labels, to what type of workload the network data packet corresponds. For example, the training controller 204 classifies network data packets into a video category, a gaming category, an audio category, a streaming category, a batch category, an analytics category, and/or a transactional category. Additionally, the example training controller 204 may include more categories than the ones listed above. Once trained, the example training controller 204 generates and publishes the trained model and provides the model to the example prediction controller 206. The example training controller 204 is described in further detail below in connection with FIG. 3. The example training controller 204 of FIG. 2 may implement means for generating. The generating means is hardware including at least one processor.

In FIG. 2, the example modem 108 includes the example prediction controller 206 to categorize network data packets into workload types and assign the network data packets corresponding labels. The example prediction controller 206 operates in an inference mode such that the example prediction controller 206 obtains network data packets from the example network packet controller 202 in real time, meaning that the prediction controller 206 obtains current (e.g., up-to-date) network data packets. The example prediction controller 206 assigns priority labels, along with workload category labels, to the network data packets based on the classification. For example, the prediction controller 206 analyzes information included in the network data packets corresponding to priority requirements (e.g., Quality of Service (QoS)) of the workload to assign priority levels to the network data packets. For example, a first network data packet classified into the gaming category corresponds to a high level priority relative to a second network data packet classified into a batch category. The levels of priority correspond to the time and performance requirements of the workload. For example, a voice call (e.g., in an audio category) requires minimum latency and high performance from the memory 104 and the processor 106 relative to an email (e.g. in the batch category) that does not require such high performance and/or minimum latency from the memory 104 and processor 106. In some examples, the prediction controller 206 assigns workload category labels (e.g., workload type labels) and identifies priority labels (e.g., QoS label) tagged in the header of the network data packets. Some network data packets include such priority labels and some network data packets do not. Therefore, the example prediction controller 206 is to determine priority labels, based on the workload category, when the network data packets do not include the priority information. In some examples, the prediction controller 206 identifies more than one workload category for more than one network data packet received at the network packet controller 202. For example, the prediction controller 206 receives inputs of data packets belonging to a single network flow but analyzes multiple network flows that may be running at the processor 106 simultaneously. In such an example, the prediction controller 206 assists in identifying which network flows to buffer and which to not buffer, based on workload categories and priority labels. In some examples, the prediction controller 206 outputs classification and labelled network data packets to the example latency value generator 210. In some examples, the prediction controller 206 is triggered by the active status controller 208 to make network data packet predictions. The example prediction controller 206 of FIG. 2 may implement means for predicting. The predicting means is hardware including at least one processor.

In FIG. 2, the example modem 108 includes the example active status controller 208 to determine the state of the modem 108. The example active status controller 208 can determine whether the example modem 108 is active, idle, or inactive. For example, the active status controller 208 can obtain information from hardware registers of the modem 108 indicating the state of the modem 108. In other examples, the active status controller 208 can query the root complex device 112 of FIG. 1 for information regarding the state of the processor 106 of FIG. 1 (e.g., on or off), which corresponds to and/or is associated with the state of the modem 108. In some examples, the active status controller 208 updates each time the state of the modem 108 updates. In some examples, the active status controller 208 sends a trigger to the prediction controller 206 when the modem 108 is in an active state. The example active status controller 208 of FIG. 2 may implement means for determining. The determining means is hardware including at least one processor.

In FIG. 2, the example modem 108 includes the example latency value generator 210 to generate latency values based on the classification and/or labels of network data packets. The example latency value generator 210 may determine appropriate latency values for different workloads. As mentioned above, a latency value is a value of time that the example processor 106 can enter a power saving C-state (e.g., C1, C2, C3, etc.). Additionally, the latency value corresponds to a value of time that the example modem 108 is to buffer network packet data. In some examples, the amount of time that the example modem 108 is to buffer network packet data corresponds to interrupt coalescing (e.g., holding back interrupts to memory 104 and/or the processor 106). For example, when the modem 108 buffers network packet data, the modem 108 is performing interrupt coalescing. In some examples, when the time runs out (e.g., the buffer time), the modem 108 generates an interrupt for the one or more network data packets buffered at the modem 108.

The example latency value generator 210 is in communication with the example computer bus 110, the example prediction controller 206, the example active status controller 208, and the example buffer 212. In some examples, the latency value generator 210 includes pre-defined information regarding what latency values correspond to different workload types. For example, a table mapping workload types to latency values may be stored in a memory (not shown) of the modem 108. In some examples, the latency value generator 210 generates latency values based on the state of the modem 108. For example, the active status controller 208 can trigger the latency value generator 210 to generate high latency values when the modem 108 is in a sleep state and/or an idle state. In some examples, the latency value generator 210 is included as part of the computer bus 110. For example, the computer bus 110 may implement the example latency value generator 210. The example latency value generator 210 of FIG. 2 may implement means for generating. The generating means is hardware including at least one processor.

In FIG. 2, the example modem 108 includes the example buffer 212 to store network data packets for a period of time specified by the example latency value generator 210. The example buffer 212 may be a cache memory, one or more hardware latches, and/or any suitable memory for storing network data packets. In some examples, the network packet controller 202 stores the network data packets in the buffer 212 and the buffer 212 evicts the network data packets to the memory 104 pending an instruction from the latency value generator 210. Such an instruction may include an interrupt to wake the memory 104 and/or processor 106 for receiving the network data packets.

An example training operation of the modem 108 is described below. During the training operation, the example network packet controller 202 obtains data packets from the example network 102. In some examples, the data packets correspond to one workload and/or different workloads. In some examples, the network packet controller 202 is configured to act as a packet capturer (e.g., packet sniffer) during training mode. For example, the network packet controller 202 may be triggered to capture one or more particular workloads based on a filter (e.g., a filter set by an operator, developer, etc., that filters through network data packets and captures the ones belonging to a particular workload) in order to pre-identify the type of workload for training. For example, the network packet controller 202 is configured to capture types of data packets belonging to the one or more particular workloads. The example network packet controller 202 identifies data packets corresponding to one workload and/or more specifically, a single network flow. A network flow is defined as all data packets (e.g., bi-directional) belonging to the same five tuple. Therefore, the example network packet controller 202 identifies data packets having the same five tuple (e.g., source address, source port, destination address, destination port, and protocol) and collects them, creating a group of data packets corresponding to a workload. The example network packet controller 202 collects data packets corresponding to the same network flow because it can be assumed that the data packets of the same network flow have the same priority requirements (e.g., QoS requirements) and, thus, priority requirements can be identified at the flow level.

The example network packet controller 202 provides the data packets to the example training controller 204 for learning and classifying the data packets into a workload type category. For example, the training controller 204 obtains the data packets grouped together as a single flow and begins the process of pre-processing (e.g., identifying a workload type) the data packets and training a model to identify the workload type without assistance from additional sources (e.g., the pre-processor, a database, program developers, etc.).

The example training controller 204 obtains data packets from the example network packet controller 202 and assigns a priority tag and workload type to the data packets. For example, the training controller 204 may determine the priority tag (e.g., the QoS) based on a header of the data packets. The header of the data packets is the information preceding the payload (e.g., data) informing the modem 108 from where the data is coming, for who the data is intended (e.g., the five tuples) as well as the priority requirements, data size, and other information depending on the protocol. Different workloads require defined QoS tags to be executable. Therefore, developers of an application (e.g., a workload) may define, in the application header and/or metadata, the type of quality required to execute the functions of the application. The definition of quality may be implemented in the header of the data packets upon transmission through a network (e.g., the network 102), and the example training controller 204 can analyze the header and identify the quality of service. The QoS of a workload may be defined by defining minimum and/or maximum values that the computing device platform 100 must meet during execution of the workload. Such values may correspond to packet loss, bit rate, throughput, jitter, transmission delay, latency, availability, etc. For example, voice call workloads may require that the computing device platform 100 executes the workload with minimum packet loss and transmission delay as well as high throughput and bit rate. In some examples, the priority tag (e.g., QoS tag) is a numerical value corresponding to a ranking, where a lower value is indicative that the workload does not require a high level of service and a higher value is indicative that the workload requires a high level of service. In some examples, an application and/or software developer may not define priority requirements. In such an example, the training controller 204 may identify the priority tag (e.g., priority requirement) based on the workload type.

The example training controller 204 obtains data packets from the example network packet controller 202 (e.g., including and/or excluding the QoS tag) and selects n packet samples from the data packets corresponding to the same network flow (e.g., workload), where n is a number of data packets. For example, the training controller 204 determines the n number of packet samples based on the computational capabilities of the modem 108. For example, modem 108 can be of any size and include any number of hardware components that can process data up to a particular amount and a certain speed. Therefore, n is selected based on hardware and/or software features of the example modem 108.

In some examples, the network packet controller 202 selects n packet samples to provide to the training controller 204. In some examples, the network packet controller 202 assigns the workload label to the n packet samples prior to providing the samples to the training controller 204 based on packet traces captured for that workload. For example, the filters set for the network packet controller 202 during training mode may facilitate storage and/or saving of packet traces in particular files based on the packets' characteristics, where the files are named based on the workload type. For example, file packet audio streaming may include and/or otherwise contain packet samples corresponding to an audio streaming workload.

The example training controller 204 extracts f packet features from the n samples, where f is the number of features of one of the n packet samples. The example training controller 204 assigns workload labels to the n packet samples and the f features based on the packet traces captured for that workload.

When the example training controller 204 tags and/or assigns labels to the n packet samples, the example training controller 204 trains a model with the n packet samples and f features. For example, the training controller 204 inputs the labelled n packet samples with corresponding f features and associates the f features with the workload types. The example training controller 204 inputs multiple sets of n packet samples corresponding to different workloads during training. The example training controller 204 may pause training to evaluate and/or test the model against a random data set (e.g., randomly selected data packets). For example, the training controller 204 may utilize K-Fold Cross validation by splitting the data set into a K number of sections/folds where each fold is used as a testing set at some point. When testing and evaluation of the model evaluates that a certain amount of error has been achieved, the example training controller 204 publishes the model and provides the published model to the example prediction controller 206.

Figure 3:
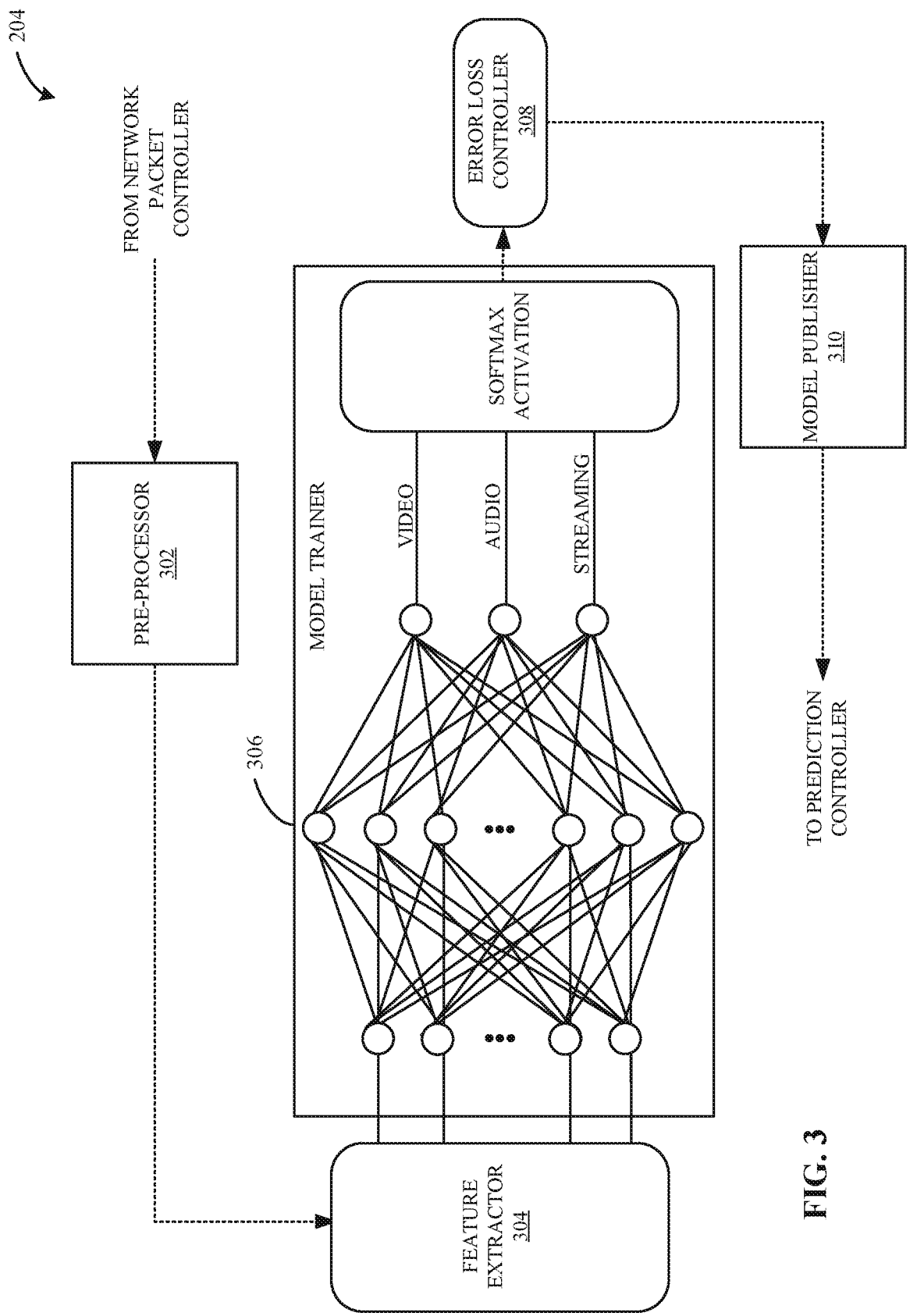
FIG. 3 is a block diagram of an example training controller of the example modem of FIGS. 1 and 2 to train a model to train a model to classify network data packets into workload categories.

Turning to FIG. 3, a block diagram of the example training controller 204 is illustrated to train the model to classify data packets into workload categories. The example training controller 204 includes an example pre-processor 302, an example feature extractor 304, an example model trainer 306, an example error loss controller 308, and an example model publisher 310.

In FIG. 3, the example training controller 204 includes the example pre-processor 302 to assign labels to data packets. The example pre-processor 302 obtains data packets from the example network packet controller 202 and selects n data packets, belonging to a single network flow, to use as input samples. In some examples, the pre-processor 302 obtains n data packets from the network packet controller 202. The example pre-processor 302 assigns the workload label to the n packet samples based on the packet traces and/or information corresponding to the packet traces captured by the example network packet controller 202.

The example pre-processor 302 extracts f features from the n packet samples. For example, the pre-processor 302 may extract features such as packet length, inter-arrival time, packet direction, and QoS tags. The example pre-processor 302 may extract any other statistical features and/or characteristics from the packet samples that are useful in identifying the type of workload. In some examples, the pre-processor 302 can extract features corresponding to a header of the packet samples. The header of packet samples can be useful for the model trainer 306 in determining the workload type. For example, an email packet may include a particular protocol identifier in the header that is specific to email. In other examples, the pre-processor 302 extracts features corresponding to the inter-packet arrival times of the packet samples which can be useful for the model trainer 306 in determining the workload type. For example, the inter-packet arrival times can be used to infer that the packet samples correspond to an audio workload category. For example, if data packets are being sent to the modem 108 on average every 20 milliseconds (ms), the inter-packet arrival time of the n packet samples may be equal to approximately 20 ms with some standard deviation. In such an example, packet samples having an inter-packet arrival time equal to approximately 20 ms may correspond to an audio category. Additionally, if the packet samples are relatively small in length (e.g., bit length) and have an inter-packet arrival time of 20 ms, then the packet samples correspond to the audio category.

In FIG. 3, the example pre-processor 302 assigns the identified workload category label (e.g., identified by the packet traces captured) to the n packet samples and then provides the labeled packet samples to the example feature extractor 304. In some examples, the pre-processor 302 appends and/or prepends metadata to the n packet samples including a string of characters or some other type of identifier. Additionally, the example pre-processor 302 may tag the n packet samples with a priority tag (e.g., a QoS tag) corresponding to the priority requirements of the network flow. In some examples, the pre-processor 302 is provided with the priority tag by the network packet controller 202. In other examples, the pre-processor 302 determines the priority tag based on the workload category. For example, the pre-processor 302 defines a priority level based on known requirements of particular workloads. In some examples, the pre-processor 302 obtains second, third, fourth, fifth, etc., sets of data packets from the network packet controller 202, corresponding to different network flows, and selects n packet samples and f features to which workload labels are assigned.

In FIG. 3, the example training controller 204 includes the example feature extractor 304 to generate a feature vector based on pre-processed packet samples and features from the example pre-processor 302. The example feature extractor 304 generates or builds derived values of feature vectors (e.g., representative of features in n packet samples) that are to be informative and non-redundant to facilitate the training phase of the training controller 204. As used herein, a feature vector is an n-dimensional array (e.g., a vector) of features that represent some workload category. For example, a feature could be one of the f features such as inter-packet arrival time, protocol identifier, packet direction, source and destination, packet length (e.g., bit size), QoS, etc. The example feature extractor 304 reduces processed input data (e.g., the n packet samples from the pre-processor 302) into more manageable groups (e.g., features) for processing, while describing the original network flow (e.g., data packets) with sufficient completeness and accuracy. In the illustrated example of FIG. 3, the feature extractor 304 identifies features in data packets corresponding to their intended operation (e.g., workload). The feature data provided by the pre-processor 302 facilitates the model trainer 306 in training a model to classify a data packet into a workload category. For example, the network packet controller 202 of FIG. 2 captures a plurality of network data packets from the network 102 corresponding to a video call. In such an example, the feature extractor 304 extracts data packet features and generates vectors for the data packets and provides the vectors to the model trainer 308. In some examples, the feature extractor 304 may extract a plurality of features corresponding to large sets of input data, it may extract fewer features corresponding to a smaller set of input data, etc. The number of f features corresponds to the computational capabilities of the example computing device platform 100. After the example feature extractor 304 extracts features of the packet samples, the feature extractor 304 outputs a feature vector.

In FIG. 3, the example training controller 204 includes the example model trainer 306 to train a model based on the output feature vector(s) of the feature extractor 304. The example model trainer 306 operates in a training mode where it receives a plurality of pre-processed packet samples (e.g., feature vector(s)), generates a prediction, and outputs a model based on that prediction. For the example model trainer 306 to generate a model, the example model trainer 306 receives feature vectors corresponding to pre-processed and known packet samples. For example, during a training mode, confirmations are made that the packet samples correspond to a specific workload (e.g., n packet samples are labelled with a workload type tag) so that the data packets are suitable for learning. For example, the model trainer 306 receives a feature vector indicative of the features of the packet samples and identifies a pattern in the features of the packet samples that maps the features of the packet samples to the workload category and outputs a model that captures these patterns. The example model trainer 306 provides the output model to the example error loss controller 308 to evaluate the model.

In some examples, the model trainer 306 implements an activation function, such as a rectified linear unit (ReLU), to help the model account for interaction effects and non-linear effects. An interaction effect is when one variable A affects a prediction (e.g., a workload type prediction) differently depending on the value of B. Non-linear effects correspond to increasing the value of an input and the output not increasing at the same rate or a decreasing value of an input that does not cause the output to decrease at the same rate. The activation function may include a plurality of activation layers that output a prediction vector to a softmax activation function. Such an output may be a fully connected vector including values indicative of likelihoods that the n packet samples correspond to a video workload, an audio workload, or a streaming workload. The softmax activation function is a function that takes an input vector (e.g., the prediction vector, a fully connected vector, etc.) consisting of K real numbers and normalizes the input vector into a probability distribution consisting of K probabilities proportional to the exponentials of the K real numbers. Put more simply, the output of the softmax activation function enables the output vectors of the activation function to be interpreted as probabilities by normalizing the real numbers to values between 0 and 1. The example model trainer 306 may implement any other method of learning how to classify data packets into a workload category. In examples described herein, the model trainer 306 identifies three categories: video, audio, and streaming. However, the example model trainer 306 and/or more generally the example training controller 204 is not limited to the above-mentioned three categories and can identify any number of workload types.

In FIG. 3, the example training controller 204 includes the example error loss controller 308 to evaluate the performance of the classification model. In some examples, the error loss controller 308 implements cross-entropy loss. In cross-entropy loss, the example error loss controller 308 determines that the loss value increases as the predicted probability of workload category diverges from the actual label, assigned by the example pre-processor 302. In cross-entropy loss, a perfect model would have a loss of zero. However, given that there are hundreds of different types of workloads, achieving zero loss may be impractical. Therefore, if the example error loss controller 308 determines that the model includes an acceptable amount of error and/or loss, the model may be ready for publishing. In other examples, if the example error loss controller 308 determines that the model does not meet and/or output probabilities within an acceptable amount of error and/or loss, the example error loss controller 308 may determine that re-training is to be performed by the example model trainer 306. Such re-training may cause the model to adjust weights applied to the n data packets and f features during activation, wherein the adjusted weights may generate a more expected output vector. In some examples, the error loss controller 308 is in communication with the model trainer 306 and the model publisher 310.

In FIG. 3, the example training controller 304 includes the example model publisher 310 to publish the model generated by the example model trainer 306 and provide it to the example prediction controller 206 of FIG. 2. For example, the model publisher 310 receives a model from the model trainer 306 and transforms it into a consumable format for publishing. As used herein, consumable format is defined as a model that is intended to be used and then replaced (e.g., by an updated model). The model publisher 310 transforms the model into a consumable format to constantly update the prediction controller 206 during the training and detecting phase. In some examples, the model publisher 310 determines if the received model is acceptable to publish. For example, the model publisher 310 may receive a new model that corresponds to video, audio, and streaming workload classes, but the model publisher 310 may have previously been provided with a model corresponding to video, audio, and streaming workload classes for which that previous model has not been consumed (e.g., used) by the prediction controller 206. In this example, the model publisher 310 may determine that the new received model cannot be published (e.g., until the previous model is consumed). Other examples in which a model is not acceptable to publish occur when the model publisher 310 is unable to transform the model into a consumable format, and therefore cannot provide the model to the prediction controller 206.

Returning to the example modem 108 of FIG. 2, the modem 108 enters an inference operation when the example training controller 204 outputs a published model to the example prediction controller 206. During inference, the example active status controller 208 checks the status of the modem 108. For example, the active status controller 208 determines if the modem 108 is in a sleep state, an idle state, or an active state. The active status controller 208 checks the status of the modem 108 to determine whether dynamic latency values are to be generated. For example, when the modem 108 is determined to be in a sleep state, the latency value generator 210 does not need to send latency values, thus allowing the processor 106 to enter the deepest possible sleep state. When the example active status controller 208 determines the modem 108 is in an idle state, the example modem notifies the latency value generator 210 and the latency value generator 210 generates latency values corresponding to the maximum amount of time the example buffer 212 can store data. For example, the buffer 212 may operate based on a timer that causes the data stored in the buffer 212 for a threshold period of time to be evicted. In such an example, the threshold period of time is the maximum amount of time the buffer 212 is able to store data. Therefore, when the example modem 108 is idle (e.g., not turned off but not receiving instructions from the processor 106 and/or the network 102), workloads are not being executed and the modem 108 can buffer data to allow the processor 106 to enter a power saving C-state. When the example active status controller 208 determines that the modem 108 is in the active state (e.g., receiving bi-directional network data packets corresponding to current workloads), the example active status controller 208 notifies the prediction controller 206 to infer workload types.

The example prediction controller 206 may obtain network data packets from the example network packet controller 202 and/or from the example active status controller 208. In some examples, when the prediction controller 206 obtains the network data packets from the network packet controller 202, the network packet controller 202 identifies data packets corresponding to a single network flow and provides them to the prediction controller 206. The example prediction controller 206 inputs the network data packets corresponding to a single network flow to the trained and published model. In some examples, the prediction controller 206 extracts features from the network data packets. The features assist the model in determining a workload class/type of the network flow of data packets. The example prediction controller 206 generates an output probability indicative of likelihoods of the workload class/type. For example, the prediction controller 206 generates a probability value that the network flow is an audio workload, a probability value that the network flow is a video workload, a probability value that the network flow is a streaming workload, etc. In some examples, the workload category with the highest probability value is assigned to the network data packets of the network flow. For example, the prediction controller 206 generates a flag, a message, a notification, etc., that the current network data packets are "streaming" data packets if the network data packets correspond to a streaming workload.

The example prediction controller 206 provides the flag, message, notification, etc., indicative of the current workload type to the example latency value generator 210. The example latency value generator 210 generates one or more latency values based on the output of the prediction controller 206. For example, the latency value generator 210 determines whether the network data packets can be buffered and for how long they can be buffered. In some examples, when the latency value generator 210 determines dynamic buffering of network data packets, the latency value generator 210 also is generating dynamic interrupt coalescing. For example, interrupt coalescing and latency tolerance reporting (e.g., the reporting of latency values) go hand-in-hand, such that if the latency values increase, then interrupt coalescing increases (e.g., the amount of time the modem 108 refrains and/or holds back from sending an interrupt trigger to access memory 104 and/or the processor 106 increases) and therefore buffering increases, and if latency values decrease, then interrupt coalescing and buffering decrease (e.g., the amount of time the modem 108 refrains and/or holds back from sending an interrupt trigger to access memory 104 and/or the processor 106 decreases). Thus, when the example latency value generator 210 generates one or more latency values based on the output of the prediction controller 206, the example latency value generator 210 is also generating times at which to interrupt (e.g., wake) the memory 104 and/or processor 106 from a C-state.

In some examples, the buffering of data packets corresponds to how time sensitive the workload type is and/or what the priority level of the workload type is. Therefore, the example latency value generator 210 determines the sensitivity level of the workload type. For example, the latency value generator 210 determines if the workload is latency sensitive if the workload is periodic (e.g., data packets are sent periodically and require responses in real time) and/or interactive (e.g., where a requestor such as the processor 106 or a different device connected to the network 102 is interested in an immediate response and is generally waiting for the interactive request to be executed before going on to other activities). In other examples, the latency value generator 210 determines if the workload is not latency sensitive. For example, the latency value generator 210 determines if the workload type corresponds to an aperiodic workload (e.g., a non-real-time workload), a non-interactive workload, low throughput workload, a time insensitive workload, etc.

When the example latency value generator 210 infers the sensitivity level of the workload type, the latency value generator 210 makes a decision about the latency value appropriate for the workload type. For example, if the workload is latency sensitive (e.g., time sensitive), the latency value generator 210 generates a short latency value that enables the processor 106 to enter in a first or second power saving state. In some examples, the decision is based on a C-state exit latency of the processor 106 as well as the workload type. An exit latency is the time it takes the processor 106 to leave (e.g., exit) a power saving state and enter a power execution state. The exit latencies are to be considered when determining buffering lengths and generating latency values so that the processor 106 is provided with enough time to awake (e.g., exit the C-state) and retrieve buffered data packets from the buffer 212. For example, if the latency value generator 210 reads that the processor 106 has an exit latency of 5 ms from the second C-state to the first C-state and determines that data packets can be buffered for 20 ms (e.g., based on the workload type), the latency value generator 210 may generate a latency value of 15 ms in an effort to trigger the processor 106 to exit the second C-state and execute the data packets within 20 ms.

To determine the buffering time of the data packets, the example latency value generator 210 infers the level of sensitivity of the workload. For example, the prediction controller 206 infers that a first set of network data packets corresponding to a first network flow are indicative of a video conference call. In such an example, the latency value generator 210 determines the video call workload is periodic and interactive but not extremely latency sensitive. In this manner, the example latency value generator 210 determines that it is appropriate to buffer the first set of data packets for a small period of time due to the fact that the workload can tolerate a small amount of latency between the modem 108 and the processor 106. In some examples, the latency value generator 210 determines the latency value (e.g., the buffer time) based on features of the first set of data packets. For example, the latency value generator 210 can determine the transmission delay required for the workload based on the priority requirement (e.g., QoS tag) and based the latency value on that minimum allowed delay of packet transmission.

In other examples, the prediction controller 206 infers that a second set of network data packets corresponding to a second network flow are indicative of a video gaming workload. In such an example, the latency value generator 210 determines the video gaming workload is latency sensitive and interactive. In this manner, the example latency value generator 210 determines that buffering the data packets would incur a relatively high amount of performance error and, thus, does not generate latency values. In such an example, the latency value generator 210 may inform the network packet controller 202 to send the network data packets directly to the processor 106 via the computer bus 110 and the root complex device 112.

In yet another example, the prediction controller 206 infers that a third set of network data packets corresponding to a third network flow are indicative of a batch workload. In such an example, the latency value generator 210 determines the batch workload is aperiodic, non-interactive, and not latency sensitive. In this manner, the example latency value generator 210 can generate latency values that buffer the third set of data packets for an appropriate amount of time (e.g., before the batch workload would incur performance errors). The example latency value generator 210 determines the latency value (e.g., and the buffer time) based on features of the third set of data packets. For example, the latency value generator 210 may determine the inter-packet arrival time and base the latency values on the time between packet arrivals. In other examples, the latency value generator 210 may determine the packet length (e.g., bit size) and base the latency values on the throughput required for the packet length.

When the example latency value generator 210 generates the latency value(s), the example latency value generator 210 sends a message to the example root complex device 112, via the example computer bus 110, to inform the processor 106 to enter a particular power saving state or power execution state. In some examples, the latency value generator 210 and/or more generally the modem 108 implements latency tolerance reporting (LTR) to send the latency requirement messages to the processor 106 and memory 104. For example, the LTR mechanism is dynamic due to the implementation of the prediction controller 206, striking a balance between handling latency sensitive network traffic and allowing the processor 106 to sleep (e.g., entering a power saving state) for longer duration.

Additionally, when the example latency value generator 210 generates the latency value(s), the example latency value generator 210 triggers the storage of network data packets in the example buffer 212 (e.g., interrupt coalescing). For example, the latency value generator 210 may initiate a timer, corresponding to the latency value, and the network packet controller 202 may store the data packets in the buffer 212. In some examples, the latency value generator 210 does not trigger data buffering. For example, when the data packets correspond to latency sensitive workloads, the latency value generator 210 triggers the network packet controller 202 to send the data packets to the processor 106 and/or memory 104.

While an example manner of implementing the modem 108 of FIG. 1 is illustrated in FIGS. 2-3, one or more of the elements, processes and/or devices illustrated in FIGS. 2-3 may be combined, divided, re-arranged, omitted, eliminated and/or implemented in any other way. Further, the example network packet controller 202, the example training controller 204, the example prediction controller 206, the example active status controller 208, the example latency value generator 210, the example pre-processor 302, the example feature extractor 304, the example model trainer 306, the example error loss controller 308, the example model publisher 310, and/or, more generally, the example modem 108 of FIG. 1 may be implemented by hardware, software, firmware and/or any combination of hardware, software and/or firmware. Thus, for example, any of the example network packet controller 202, the example training controller 204, the example prediction controller 206, the example active status controller 208, the example latency value generator 210, the example pre-processor 302, the example feature extractor 304, the example model trainer 306, the example error loss controller 308, the example model publisher 310, and/or, more generally, the example modem 108 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network packet controller 202, the example training controller 204, the example prediction controller 206, the example active status controller 208, the example latency value generator 210, the example pre-processor 302, the example feature extractor 304, the example model trainer 306, the example error loss controller 308, and/or the example model publisher 310 is/are hereby expressly defined to include a non-transitory computer readable storage device or storage disk such as a memory, a digital versatile disk (DVD), a compact disk (CD), a Blu-ray disk, etc. including the software and/or firmware. Further still, the example modem 108 of FIG. 1 may include one or more elements, processes and/or devices in addition to, or instead of, those illustrated in FIGS. 2-3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the modem 108 of FIGS. 1-3 is shown in FIGS. 4-7. The machine readable instructions may be one or more executable programs or portion(s) of an executable program for execution by a computer processor and/or processor circuitry, such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 4-7, many other methods of implementing the example modem 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 4:
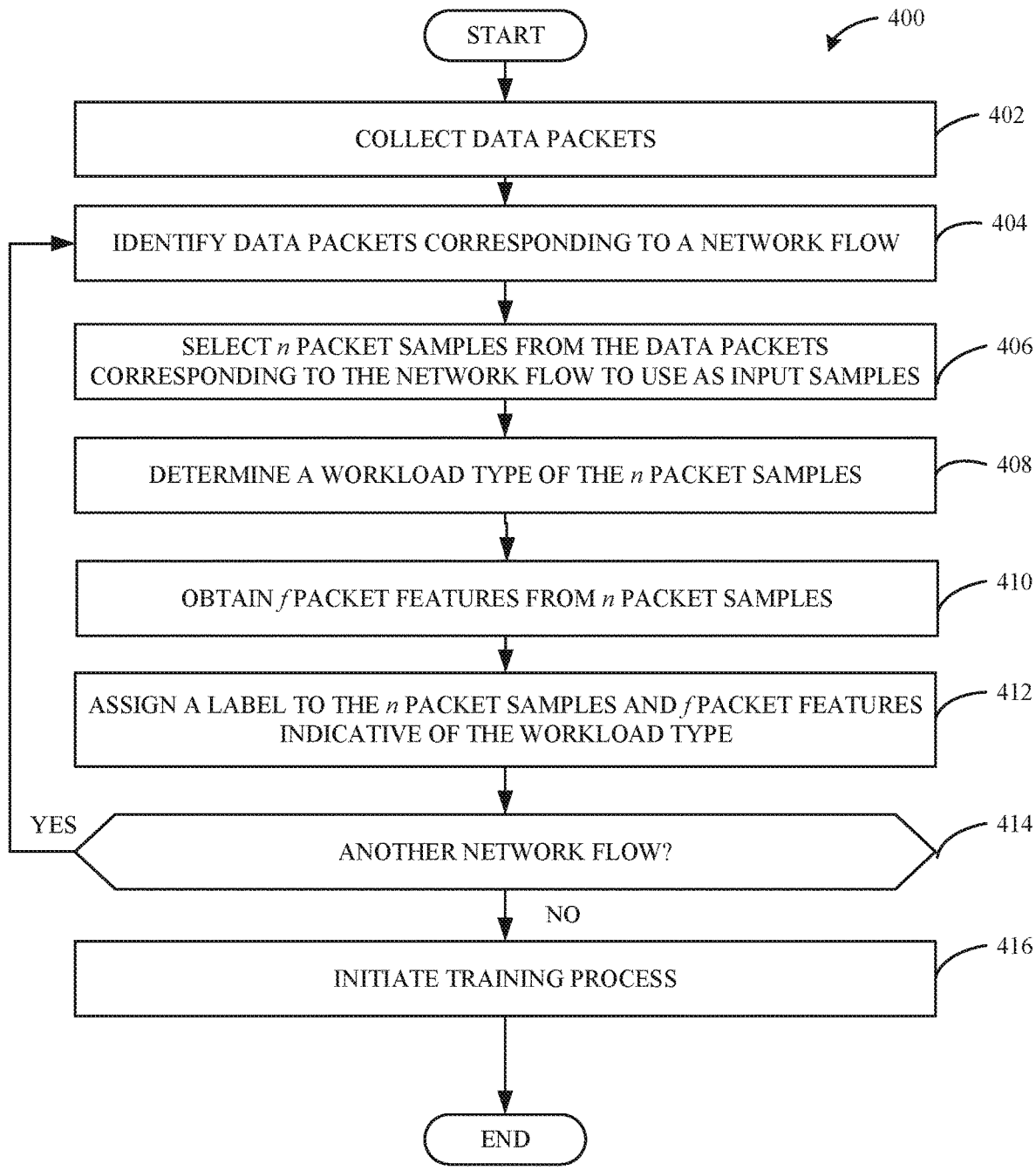
FIGS. 4-5 are flowcharts representative of machine readable instructions which may be executed to implement the example training controller of FIG. 3 to train a model to classify network data packets into workload categories.

FIG. 4 illustrates an example pre-process operation 400 of the example modem 108 of FIGS. 1-3 to assign workload labels to data packets of a single network flow. At block 402, the example network packet controller 202 (FIG. 2) collects data packets from the example network 102 (FIG. 1). For example, the network packet controller 202 utilizes a Capture Packet Trace feature to intercept data packets between the processor 106 (FIG. 1) and other wireless clients. In some examples, the network packet controller 202 is an interface (e.g., a NIC) that collects network traffic for the example computing device platform 100.

The example network packet controller 202 identifies data packets corresponding to a network flow (block 404). For example, the network packet controller 202 analyzes the header of the data packets to determine matching tuples between the data packets. In such an example, the data packets with matching tuples (e.g., a list of a source address number, a source port number, a destination address number, a destination port number, and a protocol number) belong to the same network flow. In some examples, the Capture Packet Trace feature stores intercepted data packets, belonging to the same network flow, in respective file locations corresponding to a workload category.

The example network packet controller 202 provides the data packets corresponding to a single network flow to the example training controller 204 and/or more specifically, the example pre-process controller 302 (FIG. 3). The example pre-process controller 302 selects n packet samples from the data packets corresponding to the network flow to use as input samples (block 406). For example, the pre-process controller 302 determines a number of data packets that can be analyzed and used to train a model based on the computation capabilities of the modem 108. In some examples, the pre-process controller 302 is provided with a sample limit during implementation (e.g., design and manufacturing). In other examples, the pre-process controller 302 queries hardware registers, modem storage, etc., for information regarding computation capabilities of the example modem 108.

The example pre-process controller 302 determines a workload type of then packet samples (block 408). For example, the pre-process controller 302 analyzes the file naming, information, and/or other characteristics of the packet traces captured by the network packet controller 202. In some examples, the pre-process controller 302 determines, based on the information corresponding to the packet traces, if the packet samples correspond to real-time workloads, non-real-time workloads, etc. In other examples, the pre-process controller 302 determines if the n packet samples correspond to a more specific workload type, such as video call, file download, gaming, etc.

The example pre-process controller 302 obtains f packet features from the n packet samples (block 410). For example, the pre-process controller 302 analyzes the headers of the n samples of packets for statistical information, such as inter-packet arrival time, packet direction, protocol identifier, packet length, priority class, etc. In some examples, the number of features f is selected based on the computational capabilities of the modem 108.

The example pre-process controller 302 assigns a label to the n packet samples and f packet features indicative of the workload type (block 412). For example, the pre-process controller 302 appends an identifier (e.g., a workload type identifier), such as a character string of meta data, to the n packet samples belonging to the same network flow. In some examples, the label is identifiable by the example feature extractor 304 (FIG. 3) and model trainer 306 (FIG. 3) for training a model to learn the label based on features of the packets.

The example pre-process controller 302 determines if there is another workflow (block 414). For example, the pre-process controller 302 may have received data packets belonging to more than one network flow, separated, and/or grouped together by the network packet controller 202. If the example pre-process controller 302 determines there is another network flow to label (e.g., block 414 returns a value YES), control returns to block 404. For example, the pre-process controller 302 identifies the next set of data packets belonging to a single network flow. If the example pre-process controller 302 determines there is not another network flow to label (e.g., block 414 returns a value NO), the example pre-process controller 302 initiates the training process (block 416). For example, the pre-process controller 302 triggers the feature extractor 304 by sending labelled samples of data packets.

The example pre-process operation 400 ends when the example pre-process controller 302 triggers training of a model. However, the example pre-process operation 400 is repeated when the example network packet controller 202 obtains data packets corresponding to an unidentified network flow.

Figure 5:
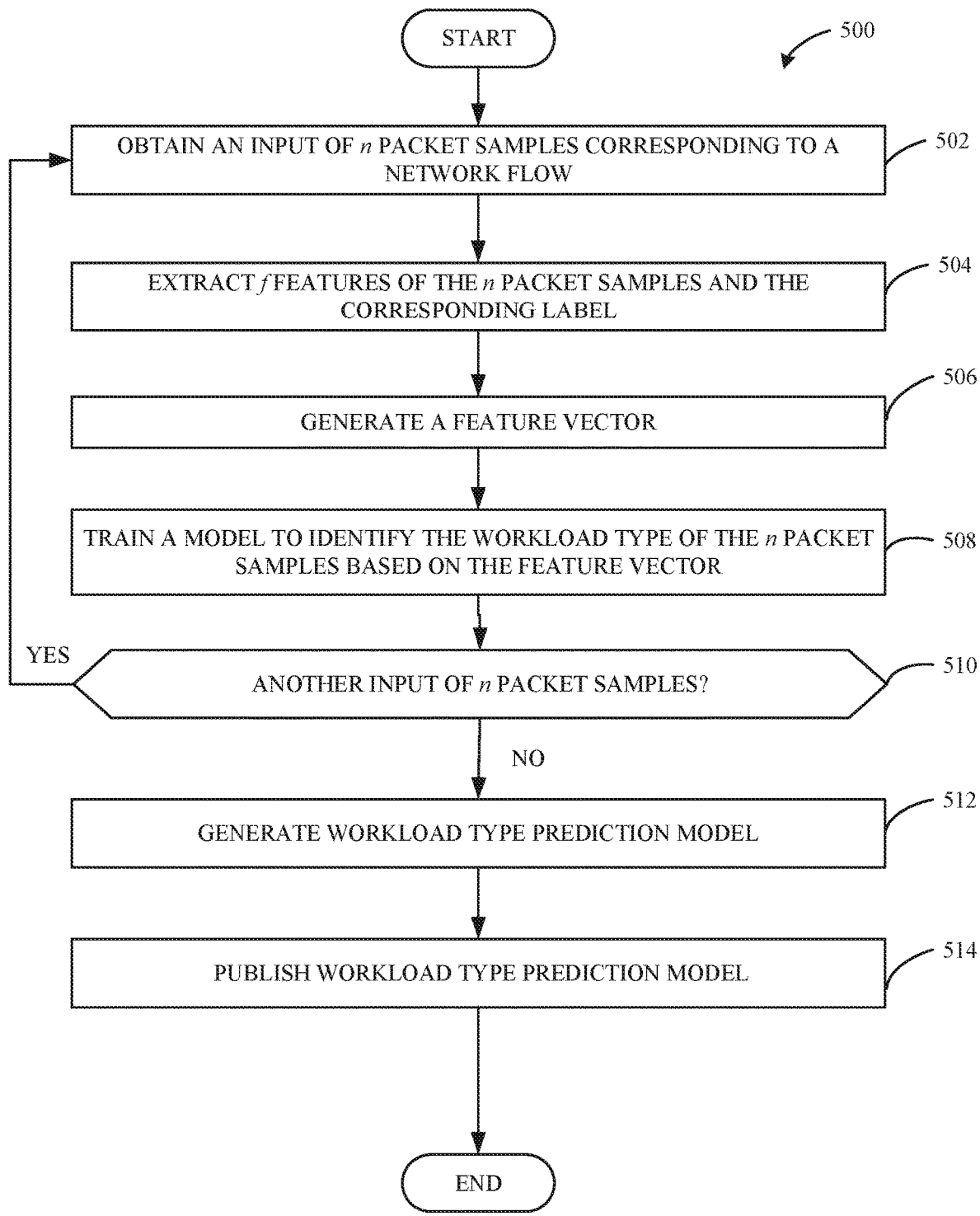

FIG. 5 illustrates an example training operation 500 of the example modem 108 of FIGS. 1-3 to train one or more model(s) to classify data packets into their respective workload categories (e.g., based on pre-processed labels and features). At block 502, the example feature extractor 304 (FIG. 3) obtains an input of n packet samples corresponding to a network flow. For example, the feature extractor 304 obtains n packet samples from the pre-process controller 302 (FIG. 3) that have been labelled with a workload type.

The example feature extractor 304 extracts f features of the n packet samples and the corresponding label (block 504). For example, the feature extractor 304 extracts the f features obtained by the pre-process controller 302, where f is a number of descriptive features describing the statistical characteristics of the n packet samples. Such descriptive features characterize the intended workload of the packet samples. The example feature extractor 304 generates a feature vector (block 506). For example, the feature extractor 304 generates or builds derived values of feature vectors (e.g., representative off features inn packet samples) that are to be informative and non-redundant to facilitate the training phase of the training controller 204.

The example model trainer 306 (FIG. 3) trains a model to identify the workload type of the n packet samples based on the feature vector (block 508). For example, the model trainer 306 receives feature vectors corresponding to pre-processed and known packet samples and identifies a pattern in the features of the packet samples that maps the features of the packet samples to the workload category and outputs a model that captures these patterns. In some examples, the output model is re-trained with different input samples until an acceptable amount of error is achieved.

The example model trainer 306 determines if another input of n packet samples is available (block 510). For example, the model trainer 306 determines whether data packets corresponding to different workloads are available. If the example model trainer 306 determines that another input of n packet samples is available (e.g., block 510 returns a value YES), control returns to block 502. If the example model trainer 306 determines that another input of n packet samples is not available (e.g., block 510 returns a value NO), then the example model trainer 306 generates a workload type prediction model (block 512). For example, the model trainer 306 outputs the trained model to the model publisher 310 (FIG. 3).

The example model publisher 310 publishes the workload type prediction model (block 514). For example, the model publisher 310 receives a model from the model trainer 306 and transforms it into a consumable format for publishing. The example model publisher 310 provides the published model to the example prediction controller 206 (FIG. 2) and the training operation 500 ends. In some examples, the training operation 500 is repeated when the feature extractor 304 obtains new packet samples from the pre-process controller 302.

Figure 6:
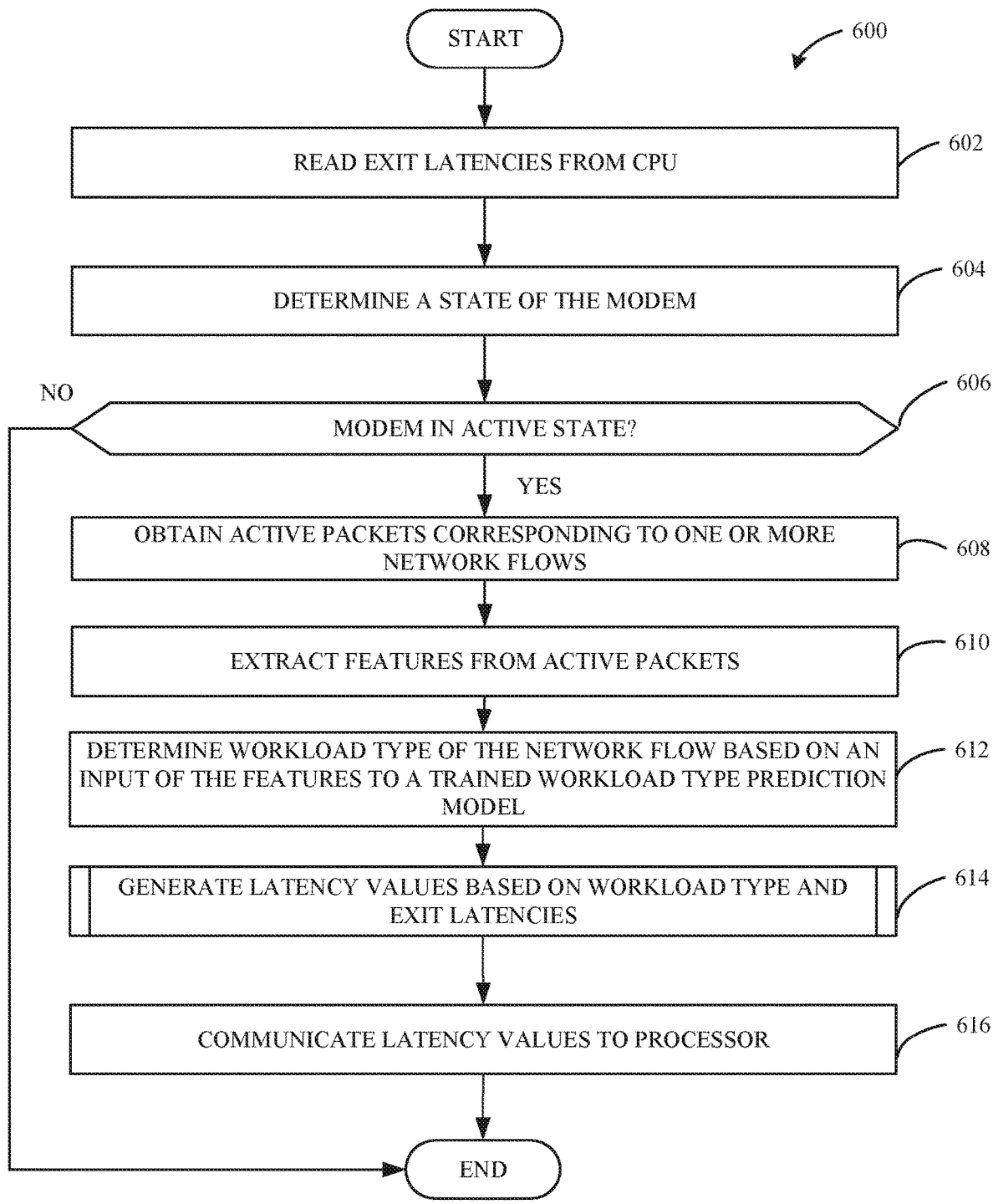
FIGS. 6-7 are flowcharts representative of machine readable instructions which may be executed to implement the example modem of FIGS. 1-2 to generate dynamic latency values in real time.

FIG. 6 illustrates an example inference operation 600 of the example modem 108 of FIG. 2 to classify data packets into a workload category and generate dynamic latency values based on the data packets. At block 602, the example latency value generator 210 (FIG. 2) reads the exit latencies from the example processor 106 (FIG. 1). For example, the latency value generator 210 queries the root complex device 112 to retrieve exit latency values for the different power saving states of the processor 106. In some examples, the root complex device 112 may query the memory controller 114 for exit latency values.

The example active status controller 208 (FIG. 2) determines a state of the example modem 108 (FIG. 1) (block 604). For example, the active status controller 208 determines whether the modem 108 is in a sleep state, an idle state, or an active state by querying the root complex device 112 (FIG. 1) for information regarding the state of the processor 106 (FIG. 1) (e.g., on or off), which corresponds to and/or is associated with the state of the modem 108. The example active status controller 208 determines whether the modem 108 is in an active state (block 606). For example, the active status controller 208 determines if the modem 108 is executing, processing, receiving, and/or sending data. If the example active status controller 208 determines the modem 108 is not in an active state (e.g., block 606 returns a value NO), the example inference operation 600 ends. For example, if the modem 108 is in a sleep state or an idle state, the latency value generator 210 generates maximum latency values to enable the processor 106 to go into a deep power saving state and does not require the information for generating dynamic latency values.

If the example active status controller 208 determines the modem 108 is in an active state (e.g., block 606 returns a value YES), the example prediction controller 206 obtains active packets corresponding to one or more network flows (block 608). For example, the network packet controller 202 provides network data packets, captured, to the prediction controller 206 for analysis and classification. In some examples, the active status controller 208 triggers the network packet controller 202 to send the active data packets to the prediction controller 206. In other examples, the active status controller 208 initiates the prediction controller 206 to query the network packet controller 202 for the active data packets.

The example prediction controller 206 extracts features from the active packets (block 610). For example, the prediction controller 206 identifies statistical information in the header(s) of the data packet(s) and extracts them out into a feature vector. The example prediction controller 206 determines a workload type of the network flow based on an input of the features to a trained workload type prediction model (block 612). For example, the prediction controller 206 implements the model, published by the training controller 204 (FIG. 2), to output a prediction about the classification of the active data packets. In some examples, the prediction indicates whether the active data packets are most likely to belong to a real-time workload, a non-real-time workload, a video call workload, a gaming workload, a file download workload, etc. In some examples, the prediction controller 206 outputs the prediction of the workload type to the latency value generator 210.

The example latency value generator 210 generates latency values based on the workload type and exit latencies (block 614). For example, the latency value generator 210 may determine, based on the performance and quality requirements of the workload type, as well as the exit latency of the processor 106, what an acceptable latency value would be. Further example instructions that may be used to implement block 614 are described below in connection with FIG. 7.

The example latency value generator 210 communicates latency values to the processor 106 (block 616). For example, the latency value generator 210 generates LTR messages, informing the memory controller 114 (FIG. 1) and/or the processor 106 to enter into a power saving state or a power execution state. In some examples, the latency value generator 210 reduces unnecessary consumption of power of the computing device platform 100 by sending such latency values to the processor 106.

Figure 7:
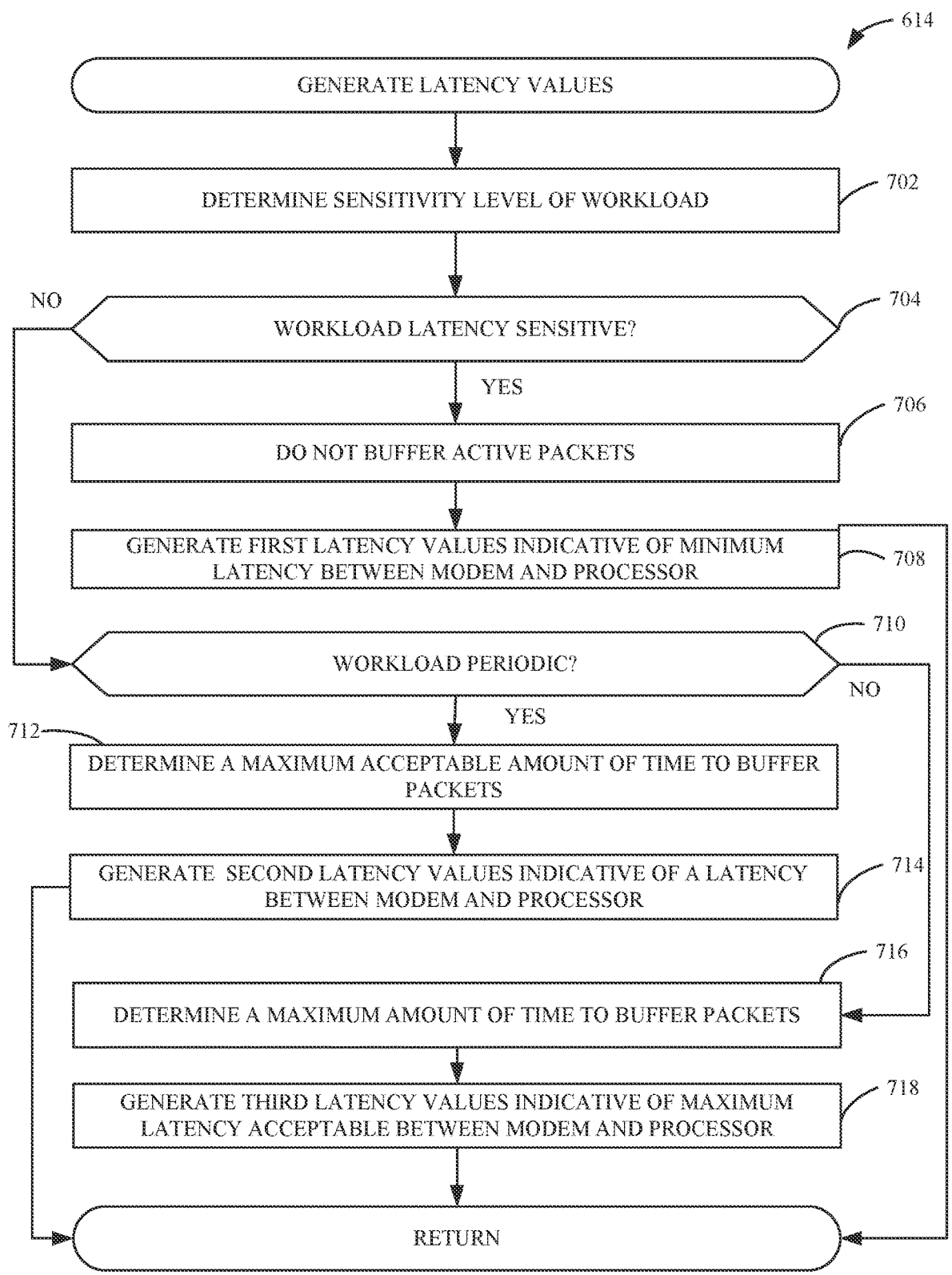

Turning to FIG. 7, the example latency generation program 614 begins when the example latency value generator 210 is triggered by the example prediction controller 206 to generate latency values. The example latency value generator 210 determines the sensitivity level of the workload (block 702). For example, the latency value generator 210 determines how latency sensitive the workload is. A latency sensitive workload corresponds to a workload that requires minimum latency during execution for purposes of performance. In some examples, the latency value generator 210 determines latency sensitive workloads based on the predicted classification (e.g., the assigned label) of the workload. For example, the workload classification may correspond to a particular priority level (e.g., QoS tag) which is related to the sensitivity of the workload.

The example latency value generator 210 determines if the workload is latency sensitive (block 704). For example, the latency value generator 210 determines if the workload requires high throughput, little to no latency (e.g., minimal processing delays), and/or high interaction. If the example latency value generator 210 determines the workload is latency sensitive (e.g., block 704 returns a value YES), the example latency value generator 210 determines that the example buffer 212 is to not buffer active packets (block 706). For example, the latency value generator 210 determines that buffering the active data packets, corresponding to a latency sensitive workload, causes performance issues. Therefore, active data packets of the latency sensitive workload are to be provided to the example memory 104 and/or the example processor 106 immediately for processing.

The example latency value generator 210 generates first latency values indicative of minimum latency between the example modem 108 and processor 106 (block 708). For example, the latency value generator 210 generates time values indicative of times for which the processor 106 is to receive and execute the active data packets. In some examples, the first latency values cause the processor 106 processing the packets to enter the power executing state. The example latency value generator 210 sends the first latency values to the example processor 106.

If the example latency value generator 210 determines that the workload is not latency sensitive (e.g., block 704 returns a value NO), the example latency value generator 210 determines whether the workload is periodic (block 710). For example, the latency value generator 210 determines whether data packets corresponding to the workload arrive at the network packet controller 202 periodically, frequently, etc. Such workloads that may be period are video calls (e.g., Skype meeting, WebEx meeting, etc.), audio calls, etc.

If the example latency value generator 210 determines that the workload is periodic (e.g., block 710 returns a value YES), the example latency value generator 210 determines a maximum acceptable amount of time to buffer packets (block 712). For example, the latency value generator 210 determines, based on the priority requirements of the workload, how long the active data packets can be buffered in the buffer 212 before performance is negatively affected.

The example latency value generator 210 generates second latency values indicative of a latency between the example modem 108 and the example processor 106 (block 714). For example, the latency determined by the latency value generator 210 corresponds to 1) the maximum amount of time acceptable to buffer the data packets of the periodic workload and 2) the exit latencies of the processor 106. In some examples, the second latency values are time values enabling the processor 106 to enter into a particular power saving state. The example latency value generator 210 sends the second latency values to the example processor 106.

If the example latency value generator 210 determines that the workload is not periodic (e.g., block 710 returns a value NO), the example latency value generator 210 determines a maximum amount of time to buffer packets (block 716). For example, if the workload is not latency nor periodic, the workload may correspond to a non-interactive workload. In such an example, the data packets are to be stored (e.g., buffered) in the buffer 212 for a maximum amount of time the buffer 212 can store the data, because performance will not be negatively affected.

The example latency value generator 210 generates third latency values indicative of the maximum latency acceptable between the example modem 108 and the example processor 106 (e.g., block 718). For example, the latency value generator 210 generates latency values corresponding to the maximum buffer time, which enables the processor 106 to enter into a power saving state. The example latency value generator 210 sends the latency values to the example processor 106.

Figure 8:
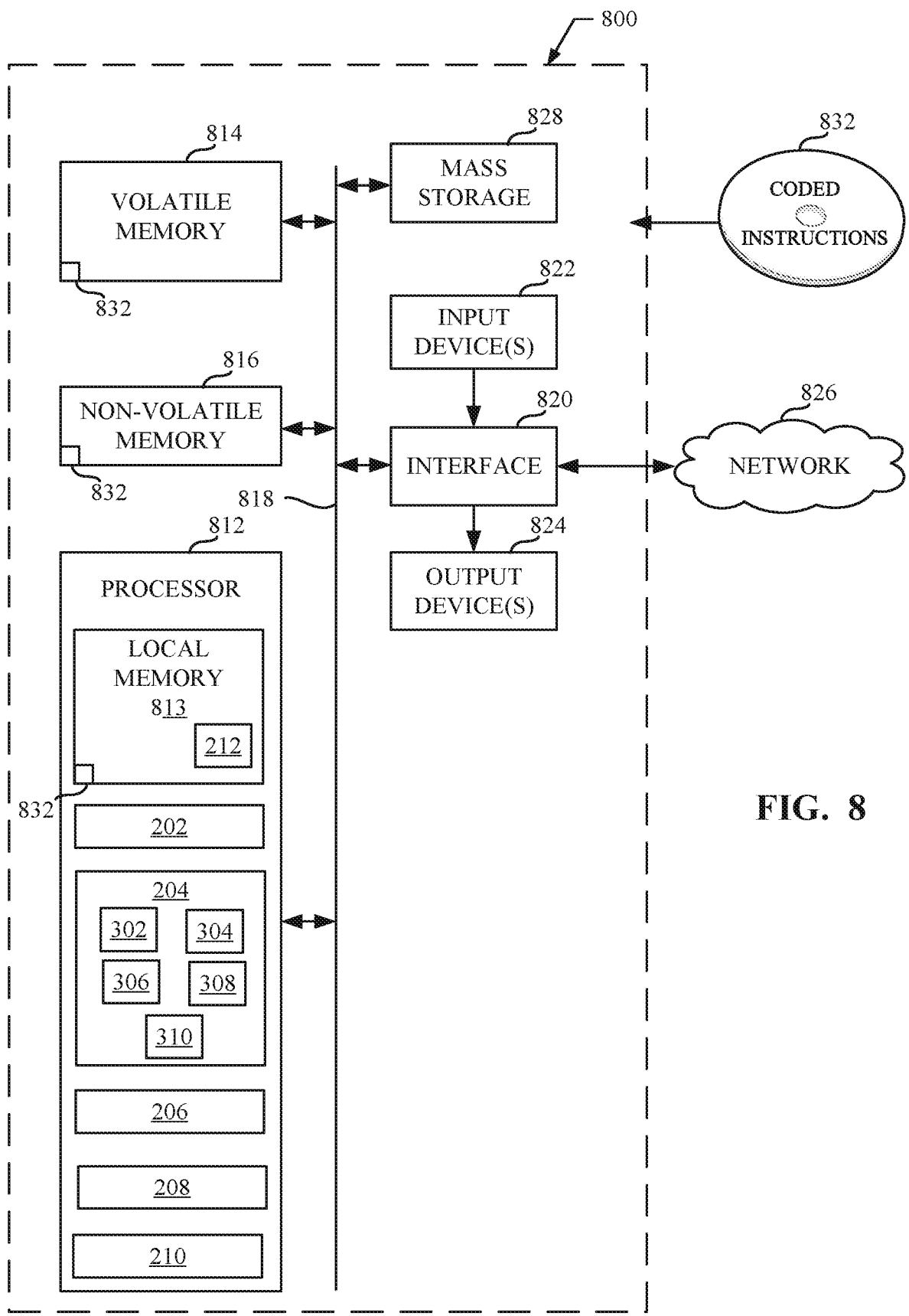
FIG. 8 is a block diagram of an example processing platform structured to execute the instructions of FIGS. 4-7 to implement the example modem of FIGS. 1-3.

FIG. 8 is a block diagram of an example processor platform 800 structured to execute the instructions of FIGS. 4-7 to implement the modem 108 of FIGS. 1-3. The processor platform 800 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example modem 108, the example network packet controller 202, the example training controller 204, the example prediction controller 206, the example active status controller 208, the example latency value generator 210, the example preprocessor 302, the example feature extractor 304, the example model trainer 306, the example error loss controller 308, and the example model publisher 310.

The processor 812 of the illustrated example includes a local memory 813 (e.g., a cache). In some examples, the local memory 813 implements the example buffer 212. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip, and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 4-7 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that train a model to infer workload types of network traffic to enable a latency value generator to generate messages that facilitate maximum power saving of a computing device platform. The examples disclosed herein reduce the number of interrupts to a host (e.g., a processor) in idle scenarios (e.g., when the modem is idle) which require very few interrupts and reduce the number of interrupts in active scenarios (e.g., when the modem is active) when workload is determined to be non-interactive, aperiodic, and/or low priority which do not require many interrupts, thus facilitating deep power saving states of the processor for longer durations of time and hence longer battery life in active workload scenarios. The disclosed methods, apparatus and articles of manufacture improve the efficiency of using a computing device by facilitating power saving and performance of the computing device when dynamic latency values are generated. The disclosed methods, apparatus and articles of manufacture are accordingly directed to one or more improvement(s) in the functioning of a computer.

Example methods, apparatus, systems, and articles of manufacture to generate dynamic latency messages in a computing system are disclosed herein. Further examples and combinations thereof include the following:

Example 1 includes an apparatus comprising an active status controller to determine that a modem is active based on a number of packets obtained from a network, a prediction controller to predict that the number of packets are indicative of a workload type based on a trained model, and a latency value generator to generate a latency value based on the workload type of the number of packets, the latency value to cause a processor processing the number of packets to enter a power saving state or a power executing state.

Example 2 includes the apparatus of example 1, wherein the prediction controller is to extract a number of features from the number of packets corresponding to statistical characteristics of packets to generate a feature vector.

Example 3 includes the apparatus of example 2, wherein the prediction controller is to infer the workload type based on the feature vector.

Example 4 includes the apparatus of example 1, wherein the latency value generator is to read a number of exit latencies from the processor to generate the latency value, the number of exit latencies corresponding to an amount of time the processor takes to exit the power saving state and enter the power executing state.

Example 5 includes the apparatus of example 1, wherein the latency value generator is to determine that the workload type is latency sensitive, provide the number of packets directly to the processor, and generate first latency values indicative of minimum latency between the modem and the processor, the first latency values to cause the processor processing the number of packets to enter the power executing state.

Example 6 includes the apparatus of example 1, wherein the latency value generator is to determine that the workload type is periodic and not latency sensitive, determine a maximum acceptable amount of time to buffer the number of packets based on a priority requirement of the workload type, and generate second latency values indicative of a latency between the modem and the processor, the second latency values to cause the processor processing the number of packets to enter the power saving state.

Example 7 includes the apparatus of example 1, wherein the latency value generator is to determine that the workload type is aperiodic and not latency sensitive, determine a maximum amount of time to buffer the number of packets based on a length of a buffer, and generate third latency values indicative of a maximum latency acceptable between the modem and the processor, the third latency values to cause the processor processing the number of packets to enter the power saving state.

Example 8 includes a non-transitory computer readable storage medium comprising instructions that, when executed, cause one or more processors to at least determine that a modem is active based on a number of packets obtained from a network, predict that the number of packets are indicative of a workload type based on a trained model, and generate a latency value based on the workload type of the number of packets, the latency value to cause a processor processing the number of packets to enter a power saving state or a power executing state.

Example 9 includes the non-transitory computer readable storage medium of example 8, wherein the instructions, when executed, cause the one or more processors to extract a number of features from the number of packets corresponding to statistical characteristics of packets to generate a feature vector.

Example 10 includes the non-transitory computer readable storage medium of example 9, wherein the instructions, when executed, cause the one or more processors to infer the workload type based on the feature vector.

Example 11 includes the non-transitory computer readable storage medium of example 8, wherein the instructions, when executed, cause the one or more processors to read a number of exit latencies from the processor to generate the latency value, the number of exit latencies corresponding to an amount of time the processor takes to exit the power saving state and enter the power executing state.

Example 12 includes the non-transitory computer readable storage medium of example 8, wherein the instructions, when executed, cause the one or more processors to determine that the workload type is latency sensitive, provide the number of packets directly to the processor, and generate first latency values indicative of minimum latency between the modem and the processor, the first latency values to cause the processor processing the number of packets to enter the power executing state.

Example 13 includes the non-transitory computer readable storage medium of example 8, wherein the instructions, when executed, cause the one or more processors to determine that the workload type is periodic and not latency sensitive, determine a maximum acceptable amount of time to buffer the number of packets based on a priority requirement of the workload type, and generate second latency values indicative of a latency between the modem and the processor, the second latency values to cause the processor processing the number of packets to enter the power saving state.

Example 14 includes the non-transitory computer readable storage medium of example 8, wherein the instructions, when executed, cause the one or more processors to determine that the workload type is aperiodic and not latency sensitive, determine a maximum amount of time to buffer the number of packets based on a length of a buffer, and generate third latency values indicative of a maximum latency acceptable between the modem and the processor, the third latency values to cause the processor processing the number of packets to enter the power saving state.

Example 15 includes a method comprising determining that a modem is active based on a number of packets obtained from a network, predicting that the number of packets are indicative of a workload type based on a trained model, and generating a latency value based on the workload type of the number of packets, the latency value to cause a processor processing the number of packets to enter a power saving state or a power executing state.

Example 16 includes the method of example 15, further including extracting a number of features from the number of packets corresponding to statistical characteristics of packets to generate a feature vector.

Example 17 includes the method of example 15, further including reading a number of exit latencies from the processor to generate the latency value, the number of exit latencies corresponding to an amount of time the processor takes to exit the power saving state and enter the power executing state.

Example 18 includes the method of example 15, further including determining that the workload type is latency sensitive, providing the number of packets directly to the processor, and generating first latency values indicative of minimum latency between the modem and the processor, the first latency values to cause the processor processing the number of packets to enter the power executing state.

Example 19 includes the method of example 15, further including determining that the workload type is periodic and not latency sensitive, determining a maximum acceptable amount of time to buffer the number of packets based on a priority requirement of the workload type, and generating second latency values indicative of a latency between the modem and the processor, the second latency values to cause the processor processing the number of packets to enter the power saving state.

Example 20 includes the method of example 15, further including determining that the workload type is aperiodic and not latency sensitive, determining a maximum amount of time to buffer the number of packets based on a length of a buffer, and generating third latency values indicative of a maximum latency acceptable between the modem and the processor, the third latency values to cause the processor processing the number of packets to enter the power saving state.

Example 21 includes an apparatus comprising means for determining that a modem is active based on a number of packets obtained from a network, means for predicting that the number of packets are indicative of a workload type based on a trained model, and means for generating a latency value based on the workload type of the number of packets, the latency value to cause a processor processing the number of packets to enter a power saving state or a power executing state.

Example 22 includes the apparatus of example 21, wherein the means for generating is to read a number of exit latencies from the processor to generate the latency value, the number of exit latencies corresponding to an amount of time the processor takes to exit the power saving state and enter the power executing state.

Example 23 includes the apparatus of example 21, wherein the means for generating is to determine that the workload type is latency sensitive, provide the number of packets directly to the processor, and generate first latency values indicative of minimum latency between the modem and the processor, the first latency values to cause the processor processing the number of packets to enter the power executing state.

Example 24 includes the apparatus of example 21, wherein the means for generating is to determine that the workload type is periodic and not latency sensitive, determine a maximum acceptable amount of time to buffer the number of packets based on a priority requirement of the workload type, and generate second latency values indicative of a latency between the modem and the processor, the second latency values to cause the processor processing the number of packets to enter the power saving state.

Example 25 includes the apparatus of example 21, wherein the means for generating is to determine that the workload type is aperiodic and not latency sensitive, determine a maximum amount of time to buffer the number of packets based on a length of a buffer, and generate third latency values indicative of a maximum latency acceptable between the modem and the processor, the third latency values to cause the processor processing the number of packets to enter the power saving state.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   an active status controller to determine that a modem is active based on a number of packets obtained from a network;
   a prediction controller to predict that the packets are indicative of a workload type based on a trained model, the prediction controller to extract a number of features corresponding to statistical characteristics of the packets to generate a feature vector, the prediction controller to infer the workload type based on the feature vector; and
   a latency value generator to generate a latency value based on the workload type of the packets, the latency value to cause a processor to enter a power saving state or a power executing state.

2. The apparatus of claim 1, wherein the latency value generator is to:
   determine that the workload type is latency sensitive;
   provide the packets directly to the processor; and
   generate first latency values indicative of minimum latency between the modem and the processor, the first latency values to cause the processor to enter the power executing state.

3. The apparatus of claim 1, wherein the latency value generator is to:
   determine that the workload type is periodic and not latency sensitive;
   determine a maximum acceptable amount of time to buffer the packets based on a priority requirement of the workload type; and
   generate second latency values indicative of a latency between the modem and the processor, the second latency values to cause the processor to enter the power saving state.

4. The apparatus of claim 1, wherein the latency value generator is to:
   determine that the workload type is aperiodic and not latency sensitive;
   determine a maximum amount of time to buffer the packets based on a length of a buffer; and
   generate third latency values indicative of a maximum latency acceptable between the modem and the processor, the third latency values to cause the processor to enter the power saving state.

5. An apparatus comprising:
   an active status controller to determine that a modem is active based on a number of packets obtained from a network;
   a prediction controller to predict that the packets are indicative of a workload type based on a trained model; and
   a latency value generator to generate a latency value based on the workload type of the packets, the latency value to cause a processor to enter a power saving state or a power executing state, wherein the latency value generator is to read a number of exit latencies from the processor to generate the latency value, the number of exit latencies corresponding to an amount of time the processor takes to exit the power saving state and enter the power executing state.

6. At least one non-transitory computer readable storage medium comprising instructions to cause at least one machine to at least:
   determine that a modem is active based on a number of packets obtained from a network;
   extract a number of features corresponding to statistical characteristics of the packets to generate a feature vector;
   infer that the packets are indicative of a workload type based on a trained model and the feature vector; and
   generate a latency value based on the workload type of the packets, the latency value to cause a processor to enter a power saving state or a power executing state.

7. The at least one non-transitory computer readable storage medium of claim 6, wherein the instructions are to cause one or more of the at least one machine to read a number of exit latencies from the processor to generate the latency value, the number of exit latencies corresponding to an amount of time the processor takes to exit the power saving state and enter the power executing state.

8. The at least one non-transitory computer readable storage medium of claim 6, wherein the instructions are to cause one or more of the at least one machine to:
   determine that the workload type is latency sensitive;
   provide the packets directly to the processor; and
   generate first latency values indicative of minimum latency between the modem and the processor, the first latency values to cause the processor to enter the power executing state.

9. The at least one non-transitory computer readable storage medium of claim 6, wherein the instructions are to cause one or more of the at least one machine to:
   determine that the workload type is periodic and not latency sensitive;
   determine a maximum acceptable amount of time to buffer the packets based on a priority requirement of the workload type; and
   generate second latency values indicative of a latency between the modem and the processor, the second latency values to cause the processor to enter the power saving state.

10. The at least one non-transitory computer readable storage medium of claim 6, wherein the instructions are to cause one or more of the at least one machine to:
    determine that the workload type is aperiodic and not latency sensitive;
    determine a maximum amount of time to buffer the packets based on a length of a buffer; and
    generate third latency values indicative of a maximum latency acceptable between the modem and the processor, the third latency values to cause the processor to enter the power saving state.

11. A method comprising:
    determining that a modem is active based on a number of packets obtained from a network;
    predicting that the number of packets are indicative of a workload type based on a trained model; and
    generating a latency value based on the workload type of the number of packets and a number of exit latencies corresponding to an amount of time a processor takes to exit a power saving state and enter a power executing state, the latency value to cause the processor to enter the power saving state or the power executing state.

12. The method of claim 11, further including extracting a number of features corresponding to statistical characteristics of the packets to generate a feature vector.

13. The method of claim 11, further including reading a number of exit latencies from the processor.

14. The method of claim 11, further including:
determining that the workload type is latency sensitive;
providing the packets directly to the processor; and
generating first latency values indicative of minimum latency between the modem and the processor, the first latency values to cause the processor to enter the power executing state.

15. The method of claim 11, further including:
determining that the workload type is periodic and not latency sensitive;
determining a maximum acceptable amount of time to buffer the packets based on a priority requirement of the workload type; and
generating second latency values indicative of a latency between the modem and the processor, the second latency values to cause the processor to enter the power saving state.

16. The method of claim 11, further including:
determining that the workload type is aperiodic and not latency sensitive;
determining a maximum amount of time to buffer the packets based on a length of a buffer; and
generating third latency values indicative of a maximum latency acceptable between the modem and the processor, the third latency values to cause the processor to enter the power saving state.

\* \* \* \* \*